Patented Dec. 18, 1945

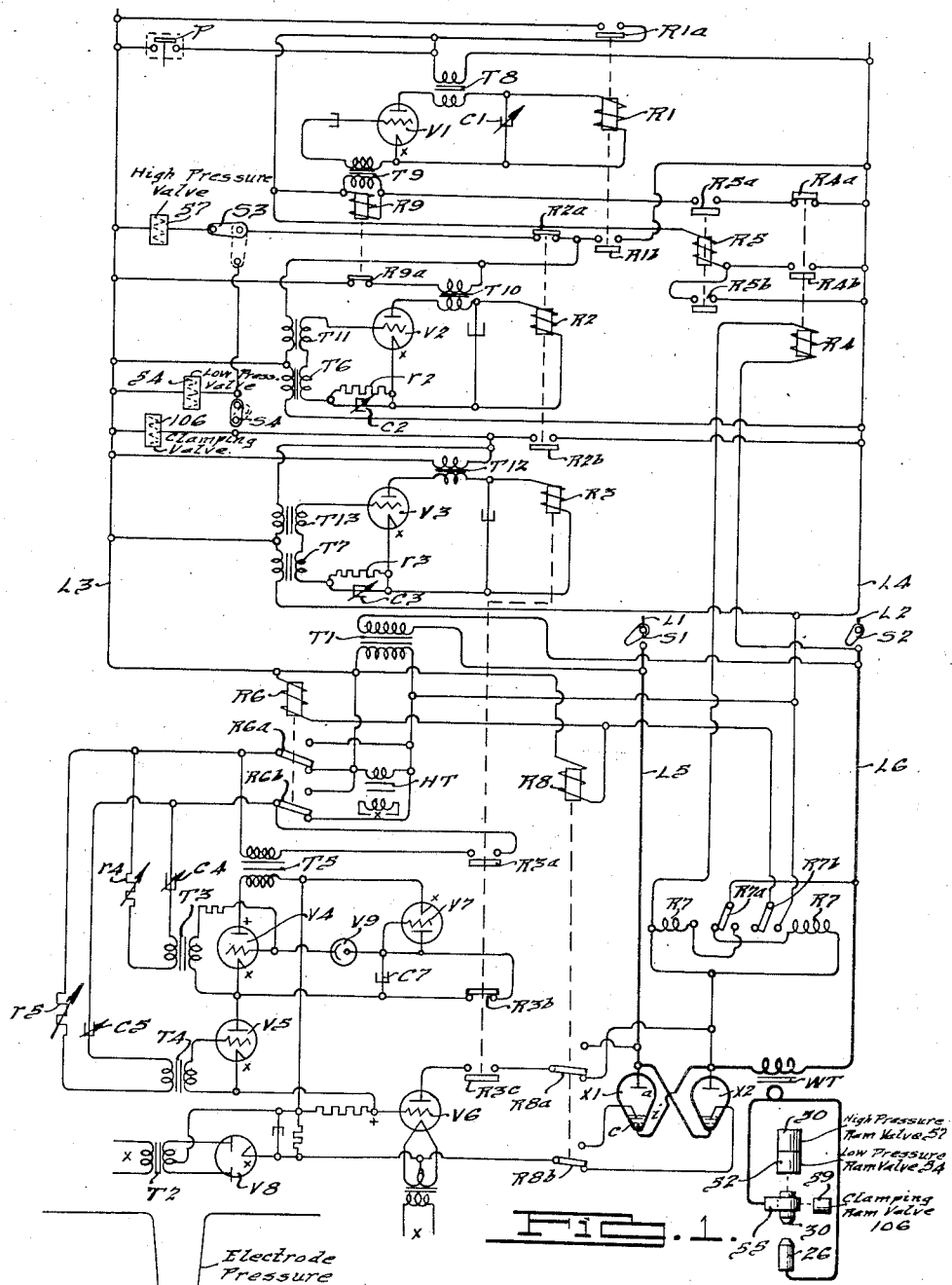

2,391,009

UNITED STATES PATENT OFFICE 2,391,009

TIMING CONTROL SYSTEM

Cletus J. Collom, Detroit, Mich.

Application December 1, 1941, Serial No. 421,164

19 Claims. (Cl. 250—27)

The present invention relates to means for welding together relatively thin sections or sheets of metals having relatively high electrical conductivity and having relatively critical temperature characteristics, more particularly aluminum and certain of the alloys thereof, such, for example, as are utilized in aircraft.

This application is a continuation in part of applicant's copending application Serial No. 369,760, filed December 12, 1940.

The principal objects of the present invention are to provide apparatus of the above-indicated character, which produces uniform welds and which is economical; to provide such apparatus, which affords a wide range of adjustment to accommodate a relatively wide range of metal thicknesses; to provide such apparatus, which may be operated with substantially greater rapidity than prior processes; to provide such apparatus by which the power for making the individual welds may be drawn directly from commercial power lines without requiring the use of current storage apparatus; to provide such apparatus by which the quantity of current supplied to each weld, while being of relatively high amperage and low voltage, and while being variable at will, is exceedingly accurately controlled; to provide such apparatus, utilizing electronic valves directly interposed in the circuit between the power source and the welding electrodes, together with control means for the valves, which limit the total time of current flow to each weld to a selectively variable fraction of one-half cycle of the alternating current supply source; to provide such apparatus, utilizing control apparatus for the valves to cause the current supplied to successive welds to correspond to alternately opposite one-half cycles of the alternating supply current; to provide such apparatus, which provides variable electrode pressures, more particularly, a relatively high initial pressure for the purpose of bringing the work surfaces into efficient contact with each other, a relatively lower pressure during the flow of welding current, so as to afford proper resistance to flow of current across the engaging work surfaces, and a final relatively higher pressure at the conclusion of the flow of welding current; and to generally improve apparatus of the above indicated character.

With the above, as well as other objects in view, which appear in the following description and in the appended claims, a preferred embodiment of the invention is described in the following specification and shown in the accompanying drawing, in which:

Figure 1 is a diagrammatic view of control circuits, embodying the invention; and, Fig. 2 is a diagrammatic view, showing electrode pressures, and current and voltage conditions in the welding circuit.

It will be appreciated from a complete understanding of the present invention that the same may be embodied in apparatus of widely differing types, the herein disclosed apparatus being shown in an illustrative but not in a limiting sense. Also, while being of particular utility in connection with the welding of relatively thin sections of metals of the above discussed class, the present system is, in a generic sense, applicable to the welding of other metals and to the welding of heavier sections of metal. The herein disclosed timing control system may, for example, be used in conjunction with a machine as described and claimed in the copending application of Hugo Purat, Serial No. 370,050, filed December 13, 1940, now Patent No. 2,304,121, dated December 8, 1942.

In a general sense, the welding sequence provided by the present system includes the steps of clamping the workpieces to be welded between a pair of electrodes, at least one of which is adjustable; applying a predetermined pressure between the electrodes in such relation as to avoid any substantial tendency to cock the work and to such a degree as to provide a predetermined amount of electrical resistance at the contacting surfaces of the workpieces; initiating a flow of current through an electronic valve interposed in the primary circuit of a supply transformer, said initiation of current taking place at a predeterminably adjustable point in the one-half cycle of alternating current wave, and said time of current flow being limited to the balance of such one-half cycle; initiating the next successive weld at a predetermined time in an opposite one-half cycle, and limiting the same to the balance of such opposite one-half cycle, and in each instance relieving the pressure on the electrodes at the expiration of a predetermined period after the termination of current flow. As is described below, it has been found preferable, in welding metals of certain thicknesses, to employ a uniform pressure throughout the welding cycle. In welding metals of relatively greater thicknesses, it has been found preferable to provide a relatively high initial electrode pressure, a reduced pressure during the flow of welding current, and a final relatively high pressure.

Referring now to Fig. 1, the present welding system comprises a stationary electrode 26, which is electrically connected to one secondary lead of the transformer WT, and a co-operating movable electrode 30. The movable electrode 30 is vertically reciprocable between the retracted position shown in Fig. 1 and a lower position, in which the work is clamped between the two electrodes 26 and 30.

In accordance with the above-identified Purat patent, the movable electrode 30 is provided with a pair of actuating rams 50 and 52, one of which may be considered a high pressure ram and the other of which may be considered a low pressure ram. The rams 50 and 52 are provided with control valves 57 and 54, respectively, it being understood that when the valve 57 is energized, it connects the high pressure ram 50 to a source of fluid pressure, such as air, thereby causing the latter to transmit relatively high pressure to the work through the electrode 30. Upon de-energization of the valve 57, the ram 50 is connected to exhaust, thereby relieving the relatively high pressure. Upon energization of the valve 54, the low pressure ram is energized to transmit a relatively low or welding pressure to the work through the electrode 30. De-energization of the valve 54, in turn, connects the ram 52 to exhaust. The hereinafter described control system provides for the proper sequential energization and de-energization of the valves 57 and 54 and also provides an adjustment to accommodate those applications in which the high pressure action is not required. It will be understood that the electrode 30 is provided with return means, such as a spring, which restores it to the upper position when both rams are connected to exhaust.

In further accordance with the above Purat patent, the movable electrode 30 is connected to the other secondary lead of the transformer WT through a fluid operated clamping member 55, which normally occupies the released position, in which it does not interfere with the up and down movements of the electrode 30. Upon energization of the associated clamping ram 59, however, the clamping member 55 is engaged with the electrode 30, so as to complete the secondary circuit of the transformer. The ram 59 is controlled by a valve 106, which is energized and de-energized in proper timed relation to the other elements of the system, as described below.

The primary winding of the transformer WT is selectively connectible to a suitable source of power, represented by the line conductors L1 and L2, through one or the other of a pair of reversely connected gaseous discharge valves X1 and X2, which valves may be variously constructed, but are preferably of the type having a metallic anode $a$, a reconstructing cathode $c$ of mercury, for example, and an igniter electrode $i$, which is permanently immersed in the cathode. Valves of this character are well known in the art. As to operation, these valves are normally non-conducting. If, however, a critical igniting potential is applied between the igniter electrode $i$ and the cathode $c$ at a time when the anode $a$ is positive with respect to the cathode $c$, the valves become conducting and pass current throughout the balance of the corresponding one-half cycle of the current wave. When such current wave passes through zero, the valves again become non-conducting and remain so until the appropriate igniter voltage is again applied, as aforesaid. The valves are critically responsive to the igniter voltage, and consequently, by varying the time in the appropriate one-half cycle at which the igniter voltage is applied, the proportion of such one-half cycle during which the valve is conducting may be accurately regulated, thus affording an exceedingly accurate means of variably controlling the proportion of each one-half cycle during which current flows from the source L1—L2 to the welding transformer.

The form of the current impulse which is passed by each valve is diagrammatically shown in Fig. 2, in which the curve E represents the voltage across the welding circuit and the curve I represents the hypothetical form of a continuous current wave in the welding circuit. Because of the inductive character of the welding load, the curve I lags behind the curve E, as will be understood. In Fig. 2, it may be assumed that the critical igniter potential is supplied to one of the previously mentioned valves at the point $x$ on the voltage wave E, thereupon rendering the corresponding valve conducting and enabling it to pass a quantity of current, represented by the shaded area. As will be evident, the value of current rises exceedingly rapidly from a zero value to substantially a maximum value and then falls off to zero along a curve substantially coincident with the balance of the one-half cycle of the curve I. A current impulse of the just-mentioned wave form is particularly advantageous in the welding of metals of the above-mentioned class. This is for the reason that by substantially instantaneously bringing the current from zero value to the maximum value, a heating action is confined to a region immediately adjacent the contacting surfaces of the work. Stated otherwise, the penetration of the welding heat from the contacting surfaces of the workpieces into the body thereof is maintained at a minimum. The gradual decrease in intensity of the welding current is also advantageous. Moreover, the just-mentioned wave form is very uniform and this fact is evidently promotive of uniform welds.

It has been found that undesirable transient conditions are produced if a welding transformer is subjected, at too high a rate, to successive current impulses of like polarity, and consequently in the preferred practice of the present process, the arrangement is such that successive current impulses transmitted to the welding transformer WT, in making successive welds, are of alternately opposite polarity. In the present control system, this is accomplished by employing the two reversely connected valves X1 and X2, and the arrangement is such that these valves are alternately ignited or fired, valve X2, for example, being fired during what may be called the positive one-half cycles and valve X1 being fired during the negative one-half cycles.

The alternate firing of the valves X1 and X2, as well as the application and relief of the electrode pressures, is under the control of a series of electronic control valves V1, V2, V3, V4, V5, V6, V7 and V8, and a corresponding series of electromagnetic relays R1, R2, R3, R4, R5, R6, R7, R8 and R9. The individual electronic valves V1, V2, V3, V6 and V7 are of usual three-element construction, each comprising an anode, a cathode and a control grid, and it will be understood that these valves are conductive so long as the anodes thereof are positive with respect to the cathodes and so long as the potential of the grid thereof is at or above a predetermined critical value with respect to the potential of the cathode. Valves V4 and V5 are of the gaseous discharge type and, upon the application of a critical voltage to the grids thereof during a half cycle in which the anodes thereof are positive, become conductive and remain so throughout the balance of such half cycle. The remaining valve V8 is provided with a cathode and a pair of anodes, it being understood that this valve functions as a full wave rectifier.

The various relays R1, R2, R3, R4, R5, R6, R8 and R9 are of usual electromagnetic form, having an operating coil and one or more contact members, which occupy the illustrated positions so long as the associated coil is de-energized and which occupy an opposite circuit controlling position, so long as the associated coil is energized. The relay R7 is provided with two operating windings. Upon a momentary energization of the lefthand winding, the contact members R7a and R7b move to the position shown in the drawing and remain in this position until the opposite or righthand winding is momentarily energized, at which time they move to the opposite circuit controlling position and remain there until the lefthand winding is again momentarily energized.

It is thought that the remaining details of the control system may best be understood from a description of the operation thereof, and it will be appreciated that the circuits are in their normal de-energized condition, such as obtain when the line switches S1 and S2 are open. In order to condition the system for operation, the switches S1 and S2 may be closed, thereby connecting the line conductors L5 and L6 directly to the source L1—L2. This action immediately applies potential to the two main valves X1 and X2, which are, however, non-conducting under the conditions stated and also applies power to the control transformer T1. The latter action continuously energizes the line conductors L3 and L4, and also energizes the filament or heater transformer HT. The secondary winding of the transformer HT bears the reference character $x$, which reference character is also applied to the cathodes of the individual tubes. It will be understood, therefore, that so long as the transformer HT is energized, the cathodes of the individual control valves are maintained at an emissive temperature.

The energization of the transformer HT also applies power to the transformer T2, the secondary winding whereof is provided with a center tap, which is connected to the grid of the valve V6. The terminals of the secondary winding of the transformer T2 are connected, respectively, to the anodes of the valve V8 and transformer T2 is thus continuously effective to apply a negative bias to the grid of the firing valve V6. This negative bias normally renders the valve V6 non-conducting, and the valves V4 and V5 serve to overcome this negative bias at appropriate times to thereby actuate one or the other of the valves X1 and X2.

As mentioned above, the present system is so arranged that the main valve X2 is fired only during positive half cycles of the current source and the main valve X1 is fired only during negative half cycles. Further, the arrangement is such that valves X1 and X2 are alternately fired. Consequently, the present connections are such that in making successive welds, the timing valves V4 and V5 are rendered conducting at predetermined points in successively opposite half cycles. That is to say, in effecting one weld the timing valves V4 and V5 are rendered conducting at a predetermined point in a positive half cycle. In making the next succeeding weld, these valves are rendered conducting at a predetermined point in a negative half cycle. The polarity of the half cycles during which the valves V4 and V5 act, is determined by the transfer relay R6 and a corresponding function in respect to the valves X1 and X2 is performed by the transfer relay R8.

It may be assumed that the next successive weld to be made will be made during a positive half cycle and, under these conditions, relays R6 and R8 are de-energized. Relay R6, when de-energized, enables the energization of transformer T1 to apply critical firing potentials to the grids of valves V4 and V5 during successive positive half cycles. The particular time in each such positive half cycle at which these critical potentials are applied is determined by the phase shifting elements C4 and r4, and C5 and r5, respectively, associated therewith. It will be understood that by suitably adjusting these valves, the critical potentials may be applied to the grids of valves V4 and V5 at separately adjustable times in each half wave of the source, and the use of the two valves affords a convenient means of delaying the actuation of the firing valve V6 to the desired point, as described with reference to Fig. 2.

The energization of line conductors L3 and L4, as aforesaid, has no effect other than to energize the grid transformers T6 and T7 associated, respectively, with the valves V2 and V3, which transformers thereupon become effective to apply blocking potentials to the grids of these valves, rendering them non-conductive.

Assuming it is desired to effect a welding operation, it will be appreciated that the workpieces in question may be interposed between the electrodes 26 and 30, and that thereafter the usual foot treadle or pilot switch, designated P in Fig. 1, may be depressed. This action immediately energizes the plate transformer T8, associated with the valve V1. Under the conditions stated, the grid transformer T9, associated with the valve V1, is de-energized, and consequently valve V1 is in a conducting condition. Upon energization of the transformer T8, accordingly, the winding of relay R1 is energized, and this relay is actuated to close its contact members R1a and R1b. The closure of contact members R1a completes a holding circuit in parallel with the pilot switch P, which may, therefore, either be retained closed throughout the welding cycle or may be immediately released to the open position.

The closure of contact members R1b completes a circuit for the winding of the high pressure valve 57 for the plate transformer T10, associated with valve V2, and for the grid transformer T11, also associated with valve V2, certain of which circuits are, as will be obvious, subject to the now closed contact members R9a and R2a.

It will be recalled from previous description that upon being energized, the valve 57 connects the ram 50 to a source of relatively high fluid pressure, thereby actuating the electrode 30 downwardly into its active position, clamping the two workpieces between the electrodes 26 and 30. The relatively high pressure employed at this stage of the welding cycle is sufficient to force the engaging surfaces of the two workpieces firmly together, preparatory to the actual making of the weld.

The energization of plate transformer T10 applies an alternating potential to the valve V2. Under the conditions stated, however, a blocking potential is applied to the grid of valve V2 by the initially energized grid transformer T6, and valve V2, therefore, is in a non-conducting condition.

The energization of grid transformer T11, which also results from the closure of contacts R1b enables this transformer to oppose the influence of transformer T6, under which conditions the energy previously stored in the timing condenser C2 is enabled to discharge through the associated resistor r2. At the expiration of a predetermined period determined by the characteristics of the timing circuit, the potential of the grid of valve V2 falls to a value at which this valve is conducting. At this time, valve V2 passes a current to energize the control relay R2.

Upon being energized, relay R2 opens its contact members R2a and closes its contact members R2b. The opening of contacts R2a interrupts the previously completed circuit for the high pressure valve 57, which thereupon relieves the pressure from the ram 50. The closure of contact members R2b completes obvious energizing circuits for the valve 54, associated with the low pressure ram 52, the valve 106, associated with the clamping ram 59, and the primary windings of transformers T12 and T13, associated with the valve V3.

The energization of valve 54 applies the relatively lower or welding pressure to the electrodes 30 and 26, and it will be understood that valve 54 may be timed to operate and apply such lower or welding pressure before the pressure in the ram 50 has fallen to a value lower than the value of the welding pressure. Thus, the change from the initial high pressure to the welding pressure is effected without reducing the pressure between the electrodes to a value lower than the welding pressure.

The energization of the clamping valve 106 applies pressure to the ram 59, which thereupon clamps the clamping member 55 around the movable electrode 30, thus completing the secondary circuit of the welding transformer, preparatory to the actual initiation of the welding current.

As in the case of valve V2, the energization of transformer T12 applies potential to the valve V3, which is, however, in a non-conducting condition by virtue of the action of transformer T7. The energization of transformer T13, however, opposes transformer T7 and enables the timing condenser C3 to discharge through the resistor r3 and ultimately bring the grid of valve V3 to a potential at which this valve becomes conducting. The time interval afforded, as will be appreciated, is just sufficient to insure the completion of the clamping action and the attainment of a stable welding pressure at the electrodes.

Upon being rendered conducting, valve V3 enables transformer T12 to energize relay R3, which thereupon closes its contacts R3a and R3c and opens its contacts R3b.

The closure of contacts R3a energizes the plate transformer T5, associated with the timing valves V4 and V5. The closure of contacts R3c connects the plate circuit of the firing valve V6 to the firing electrodes of one or the other of the main valves X1 and X2, in this case, X2. The opening of contacts R3b interrupts the normally complete discharge circuit for condenser C7, associated with the valve V7.

It will be recalled from previous description, that with relay R6 in the illustrated position, transformer T3 is, at a predetermined time in each positive one-half cycle of the main source L1—L2, enabled to render valve V4 conducting for the balance of such positive one-half cycle, and that transformer T4 is similarly enabled to render valve V5 conducting for the balance of the one-half cycle, in question. Further, as will be recalled, the point in each such one-half cycle, at which the valves V4 and V5 are rendered conducting, is separately adjustable by adjusting the timing elements C4—r4 and C5—r5, associated therewith. Transformers T3 and T4 are preferably of the peaking type, as will be understood.

The energizing circuit for transformer T5 includes the contacts of relay R6, in addition to the previously mentioned contact R3a, and relay R6 serves, as will be appreciated, to connect transformer T5 to the main control transformer T1, in such relation that transformer T5 applies positive potential to the plates of valves V4 and V5 during the positive one-half cycles. Consequently, at a predetermined point in the first positive one-half cycle of the alternating current flow, following the energization of relay R3, valves V4 and V5 are rendered conducting and enable transformer T5 to overcome the negative bias normally applied to the grid of valve V6 through the rectifier V8. As soon as this occurs, valve V6 becomes conducting and completes a firing circuit for the main valve X2, which extends from the line conductor L2 through contacts R8a and R3c, valve V6, contact R8b, the igniter electrode of valve X2, and through the cathode of this valve to the line conductor L1. As soon as this circuit is completed valve X2 becomes conducting and passes current during the balance of the positive one-half cycle of the alternating current wave, which action energizes the welding transformer WT for a corresponding period and enables the latter to cause a flow of welding current through the work for a corresponding period.

At the time valve V4 is rendered conducting, transformer T5 is also enabled to charge the timing condenser C7 through the normally conductive valve V7, which charging circuit, as will be obvious, includes, in series circuit relation, the condenser C7, the transformer T5 and plate circuits of valves V4 and V7. Condenser C7 is proportioned to receive in a fraction of the one-half cycle now being considered, a sufficient charge to break down the usual discharge tube V9, which thereupon becomes conducting and enables condenser C7 to apply a blocking potential to the grid of valve V4. The application of this blocking potential does not alter the conductivity of valve V4 during the one-half cycle in question, as will be understood, but it does prevent the valve V4 from being rendered conducting during a succeeding one-half cycle of current flow. This blocking potential is maintained on the grid of valve V4 until contacts R3b reclose, which action occurs at the conclusion of the welding cycle now being described.

At the conclusion of the positive one-half cycle of current flow, now being considered, the main valve X2 again becomes non-conducting, as will be understood, and cannot again be rendered conducting except by subsequently again firing the valve V6.

As thus far described, accordingly, the closing of the pilot switch P has caused the clamping of the work at the successive high and low pressures, the actuation of the electrode clamp and the firing of the main valve X2 to pass through the work a current impulse corresponding in length to the desired fraction of a one-half cycle of the source L1—L2.

The energization of the welding transformer WT applies a momentary energizing potential to the winding of the relay R4, which thereupon opens its contacts R4a and closes its contacts R4b. The opening of contacts R4a is without immediate effect, but the closure of contacts R4b completes an energizing circuit for the winding of the relay R5, which energizing circuit also includes the now closed contacts R1a. Upon completion of this circuit, relay R5 closes its contacts R5a and R5b. The latter contacts complete a self-holding circuit for relay R5, which is subject only to contacts R1a.

As aforesaid, the energization of relay R4 is momentary only. The re-opening of contacts R4b is without effect in view of the just-mentioned self-holding circuit. In view of the now closed condition of contacts R5a, however, the reclosure of contacts R4a completes parallel energizing circuits for transformer T9, associated with valve V1 and for the control relay R9.

Upon being energized, relay R9 opens its contacts R9a, which action interrupts the circuit for transformer T10 and consequently results in an immediate de-energization of relay R2. Upon being de-energized, relay R2 recloses its contacts R2a and re-opens its contacts R2b.

The re-opening of contacts R2b de-energizes the low pressure valve 54, associated with the ram 52, and also de-energizes the valve 106, associated with the clamping ram 59, which thereupon releases the clamping member 55.

The reclosure of contacts R2a recompletes the circuit for the valve 57, associated with the high pressure ram 50. The de-energization of relay R2 thus relieves the low pressure and re-applies the high pressure to the electrodes and it will be understood, as before, that the timing of these valve actions is such that the high pressure ram is enabled to build up its pressure at least as rapidly as the low pressure is dissipated from the low pressure ram, so that at this stage, the electrode pressure does not fall below the lower or welding value.

The energization of transformer T9 applies a blocking potential to the grid of valve V1, which thereupon becomes non-conducting, which action interrupts the energizing circuit for the winding of the relay R1. At this time, the energy stored in the winding of relay R1 is enabled to discharge through the local circuit, including the associated timing condenser C1, and at the expiration of a predetermined "hold time," relay R1 resumes the de-energized position, opening its contacts R1a and R1b. The opening of contacts R1b interrupts the circuit for the high pressure valve 57, which thereupon relieves the pressure in the ram 50 and enables the movable electrode to return to the illustrated upper position, thereby completing the welding cycle.

In addition to the operations discussed above, which are directly concerned with the completion of the welding cycle, the following actions take place to condition the system for the next cycle.

The momentary energization of the welding transformer WT also completes an obvious energizing circuit through the relay contact R7a for the righthand winding of the relay R7, which thereupon becomes effective to swing the contacts R7a and R7b from the illustrated lefthand position to the opposite or righthand position. The movement of contacts R7a breaks the circuit for the winding R7 and prepares a circuit, through which, in response to the next energization of the welding transformer WT, the lefthand winding R7 will be energized.

It will be understood that the contact R7a is so constructed as to carry over to its opposite position, even though such movement serves to interrupt the energizing circuit for the winding in question, and it will be further understood that the impulse of energizing potential applied to the relay R7 is of such short duration that while it is effective to cause one transfer movement of the relay R7, it is not effective to produce a second such operation.

The just-mentioned movement of the contact R7b completes energizing circuits for the transfer relays R6 and R8, which thereupon move their contacts from the illustrated lower positions to the opposite or upper positions. These relay circuits remain complete, as will be evident, so long as the line switches S1 and S2 are closed. If these switches are open, relays R6 and R8 become de-energized, but a reclosure of the switches S1 and S2 immediaely reenergizes the relays R6 and R8. Thus, if the welding system is taken out of service after making one weld, and is then again conditioned for service by reclosing the switches S1 and S2, the various transfer relays will assume the proper position.

The transfer of the contacts of relay R8 disconnects the righthand main valve X2 from the firing valve V6 and connects the lefthand main valve X1 thereto, so that the next time valve V6 is fired, it will actuate valve X1 instead of valve X2.

The contacts of the transfer relay R6a reverse the connections of transformres T3, T4 and T5 to the main control transformer T1, which action, as will be understood, conditions the valves V4 and V5 to apply a firing potential to the grid of the firing valve V6 at a predetermined point in a subsequent negative one-half cycle instead of at a predetermined point in a succeeding positive one-half cycle.

It will be appreciated, therefore, that the operation of relay R7, which results from an impulse being transmitted through the welding transformer WT, alters the circuits immediately associated with the firing of the main valves X1 and X2 in such relation that the next firing action will occur during a negative one-half cycle of the main current flow and will be transmitted through valve X1 instead of through valve X2.

Continuing with the description of the resetting operations, the de-energization of transformers T12 and T13, which resulted from the re-opening of contacts R2b, results in an immediate de-energization of relay R3 and re-application of a blocking potential to the grid of valve V3, which blocking potential is not removed, except at the previously described stage of the next successive welding operation.

The de-energization of relay R3 causes the opening of contacts R3a and R3c, and the reclosure of contacts R3b. The re-opening of contacts R3a interrupts the circuit for transformer T5, thus preventing a potential from being applied to the valves V4 and V5, except upon the initiation of a new welding cycle. The reclosure of contacts R3b completes a discharge circuit for condenser C7, associated with valve V7, thus removing the previously described blocking potential from the grid of the timing valve V4 and conditioning the latter for operation at the proper stage of the next welding cycle.

The de-energization of relay R1, at the conclusion of the above-described hold-time period, in addition to de-energizing the high pressure valve 57 to complete the welding action, also de-energizes the transformers T8 and T9 and relays R5 and R9. The de-energization of transformer T9 removes the blocking potential from the grid of valve V1, which action is preparatory to the next operation, but is without immediate effect, since transformer T8 is now de-energized. The other just-described actions are preparatory to the next operation.

In order to initiate another welding cycle, the pilot switch P may again be closed, which action causes the operation of relays R1, R2 and R3 in the previously described sequence, and it will be understood that the effects produced by the energizations of relays R1 and R2 duplicate those previously described. The energization of relay R3 produces the same effects as previously described, with the exception that in this instance, because of the opposite positions occupied by the transfer relays R6 and R8, the firing valve V6 is actuated at a predetermined point in a negative one-half cycle of the source, and the consequent welding impulse is transmitted to the welding transformer through the valve X1, instead of through the valve X2. By virtue of the just-mentioned welding impulse, also, relay R4 is again energized, as before, and the above-described release of the electrode clamp 55, the transfer from low pressure to high pressure, and the final release of the high pressure, occur as described above. In this instance, also, the welding impulse actuates relay R7 back to the illustrated position, which action de-energizes relays R6 and R8, thereby conditioning the firing circuits immediately associated with the main valves X1 and X2, for actuation during a succeeding positive one-half cycle.

As aforesaid, there are certain instances in which the entire welding operation can be performed without providing the above discussed variation in the pressure between the electrodes. In such instances, the manual transfer switches S3 and S4 can be moved from the illustrated full line positions to the dotted line positions, which action, as will be appreciated, eliminates the high pressure valve 57 from the system, and renders the low pressure valve 54 subject to the operation of the relay R1 instead of to the operation of the relay R2. Under such circumstances, accordingly, the closure of the pilot switch first energizes the low pressure ram 44, thereafter energizes the clamping valve 106 and thereafter, as before, produces the welding cycle. At the conclusion of the flow of welding current, the operations resulting from the momentary energization of relay R4 release the clamping valve 106, without relieving the electrode pressure, which pressure is maintained until relay R1 is de-energized at the expiration of the "hold" time.

From the foregoing detailed description of the operating steps, it will be appreciated that the present system provides generically the properly correlated steps of applying a pressure between the workpieces to be welded, utilizing main valve means of the gaseous discharge or equivalent type to initiate and interrupt the flow or welding current, and actuating such valve means so as to limit the period of current flow to a predetermined fraction of one-half cycle of the alternating current source. It is of particular advantage to limit such impulse to not more than the last half of each such half wave of the current source for the reason, as aforesaid, that this produces an impulse of exceedingly efficient wave form, particularly characterized in that the current supplied to the weld rises virtually instantaneously from a zero value to a maximum value and thereafter gradually falls off to a zero value. The system can further be characterized in that the main valve means are so controlled that successive welding operations are performed by utilizing fractions of half waves of alternately opposite polarity, thereby effectively overcoming transient conditions which might otherwise exist. As aforesaid also, in certain instances it is found satisfactory to utilize a single value of electrode pressure throughout each welding cycle, while in other instances it is preferred to first bring the electrodes together under a relatively high pressure, employ a reduced pressure during the flow of welding current, and complete the weld under the influence of a higher pressure.

It will be understood, of course, that the values of the fluid clamping pressures, the values of current and voltage, and the exact fraction of each half cycle during which the welding current flows, as well as other variables of the system, may be varied between certain limits, depending upon the characteristics, such as composition, thickness, etc., of the work. By way of illustration, but not of limitation, the following values have been found satisfactory in welding aluminum and certain of the alloys thereof now used in aircraft construction, ranging in thickness from .010 inch or less to approximately .081 inch:

a. Electrode pressure for thicknesses up to approximately .030 inch—300 lbs. to 600 lbs.
b. Electrode pressure for thicknesses above .030 inch—initial pressure 1800 lbs. to 2000 lbs., welding pressure 600 lbs. to 1000 lbs., and final pressure 1800 lbs. to 2000 lbs.
c. Current values—from 30,000 to 40,000 amperes at approximately 24 volts, to from 35,000 to 50,000 amperes at approximately 44 volts, the higher current and voltage values being employed with the thicker metal sections.
d. Time duration of current impulses—from last 75% to last 20% of one-half cycle of sixty-cycle source.

In practice, the foregoing system has been found to produce exceedingly efficient welds and has been found entirely practicable to produce such welds at relatively high rates, of the order of from 200 to 300 per minute, it being noted that the welding rate is determined primarily by the time interval required to advance the work-pieces relative to the electrodes, since each welding interval is of exceedingly short duration and the elimination of energy storing equipment removes any heretofore existing necessity for allowing sufficient time between successive welds to charge such equipment with the energy required to make each weld.

It will be appreciated that various changes in the herein specifically described system may be made within the spirit and scope of the present invention, and the present embodiment of the invention is, therefore, to be regarded in an illustrative and not in a limiting sense.

What is claimed is:

1. In a timing control system for controlling the connection between a work circuit and a source of periodically pulsating current, a valve which is normally non-conducting but which upon the application of an igniting impulse becomes conducting and remains so for the balance of one pulsation of said source, timing means for transmitting said impulse to said valve, means rendered effective as an incident to one operation of said timing means for rendering said timing means ineffective to transmit a second said impulse, and resetting means operated as a consequence of the flow of current through said valve for again rendering said timing means effective.

2. In a timing control system for controlling the connection between a work circuit and a source of periodically pulsating current, a valve which is normally non-conducting but which upon the application of an igniting impulse becomes conducting and remains so for the balance of one pulsation of said source, timing means for transmitting said impulse to said valve, means rendered effective as an incident to one operation of said timing means for rendering said timing means ineffective to transmit a second said impulse, and resetting means operably responsive to the cessation of the flow of current through said valve for again rendering said timing means effective.

3. In a timing control system for controlling the connection between a work circuit and a source of potential which periodically pulsates from a minimum through a maximum back to a minimum value, a valve which is normally nonconducting but which upon the application of an igniting impulse becomes conducting and remains so for the balance of one pulsation of said source, timing means including phase shifting elements responsive to said source for transmitting a said impulse to said valve at a time corresponding to approximately said maximum value, means rendered effective as an incident to one operation of said timing means for rendering said timing means ineffective to transmit a second said impulse, and resetting means operated as a consequence of the flow of current through said valve for again rendering said timing means effective.

4. In a timing control system for controlling the connection between a work circuit and a source of potential which periodically pulsates from a minimum through a maximum back to a minimum value, a valve which is normally nonconducting but which upon the application of an igniting impulse becomes conducting and remains so for the balance of one pulsation of said source, timing means including phase shifting elements responsive to said source for transmitting a said impulse to said valve at a time corresponding to approximately said maximum value, means rendered effective as an incident to one operation of said timing means for rendering said timing means ineffective to transmit a second said impulse, and resetting means operably responsive to the cessation of the flow of current through said valve for again rendering said timing means effective.

5. In a timing control system for controlling the connection between a work circuit and a source of alternating current, valve means which are normally non-conducting but which upon the application of an igniting impulse become conducting and remain so for the balance of one half-cycle of said source, timing means for transmitting a said impulse to said valve means during a half-cycle of one polarity, blocking means rendered effective as an incident to one operation of said timing means for rendering said timing means ineffective to transmit a second impulse, resetting means for said blocking means, and additional means rendered operative as a consequence of the operation of said timing means for causing the next impulse to be transmitted from said timing means to said valve means during a half-cycle of said source of opposite polarity.

6. In a timing control system for controlling the connection between a work circuit and a source of alternating current, valve means which are normally nonconducting but which upon the application of an igniting impulse become conducting and remain so for the balance of one half-cycle of said source, timing means for transmitting a said impulse to said valve means during a half-cycle of one polarity, blocking means rendered effective as an incident to one operation of said timing means for rendering said timing means ineffective to transmit a second impulse, resetting means operably responsive to the flow of current through said valve means for again rendering said timing means effective, and additional means rendered operative as a consequence of the operation of said timing means for causing the next impulse to be transmitted to said valve means during a half-cycle of opposite polarity.

7. In a timing control system for controlling the connection between a work circuit and a source of alternating current, valve means which are normally nonconducting but which upon the application of an igniting impulse become conducting and remain so for the balance of one half-cycle of said source, timing means for transmitting a said impulse to said valve means during a half-cycle of one polarity, blocking means rendered effective as an incident to one operation of said timing means for rendering said timing means ineffective to transmit a second impulse, resetting means operably responsive to the flow of current through said valve means for again rendering said timing means effective, and additional means operably responsive to the flow of current through said valve means for causing the next impulse to be transmitted to said valve means during a half-cycle of opposite polarity.

8. In a timing control system for controlling the connection between a work circuit and a source of alternating current, valve means which are normally nonconducting but which upon the application of an igniting impulse become conducting and remain so for the balance of one pulsation of said source, timing means operably responsive to the polarity of said source and effective upon actuation to transmit a single impulse to said valve means, and transfer means operable as an incident to the operation of said timing means for altering the connection between said timing means and said source so as to cause the next impulse to be transmitted to said valve means during a half-cycle of opposite polarity to that in which the first said impulse was transmitted.

9. In a timing control system for controlling the connection between a work circuit and a source of alternating current, valve means which are normally nonconducting but which upon the application of an igniting impulse become conducting and remain so for the balance of one pulsation of said source, timing means operably responsive to the polarity of said source and effective upon actuation to transmit a single impulse to said valve means, transfer means operable as an incident to the operation of said timing means for altering the connection between said timing means and said source so as to cause the next impulse to be transmitted to said valve means during a half-cycle of opposite polarity to that in which the first said impulse was transmitted, blocking means operable as an incident to the operation of said timing means for rendering said timing means ineffective to transmit said second impulse, and resetting means for again rendering said timing means effective.

10. In a timing control system for controlling the connection between a work circuit and a source of alternating current, a pair of reversely connected valves for respectively transmitting alternate half-cycles of said source, each of which is normally non-conducting but which upon the application of an igniting impulse becomes conducting and remains so for the balance of one half-cycle of said source, timing means operably responsive to the polarity of said source for transmitting said impulses to said valves, said timing means including blocking means effective until reset to limit said timing means to the transmission of one impulse only, and transfer means operated as an incident to the operation of said timing means for altering the connection between said timing means and said source so as to cause successive impulses to be transmitted during respectively opposite half-cycles.

11. In a timing control system for controlling the connection between a work circuit and a source of alternating current, a pair of reversely connected valves disposed to be rendered conducting during respectively opposite half-cycles of said source, both of which are normally non-conducting but which upon the application of an igniting impulse become conducting and remain so for the balance of one half-cycle of said source and both of which have a principal electrode and a control electrode, a firing valve common to said pair of valves and electrically connectible between said electrodes thereof for transmitting said impulses thereto, and transfer means operable as an incident to the operation of said firing valve for selectively connecting said firing valve to one or the other of said pair of valves.

12. In a timing control system for controlling the connection between a work circuit and a source of alternating current, a pair of reversely connected valves disposed to be rendered conducting during respectively opposite half-cycles of said source, both of which are normally non-conducting but which upon the application of an igniting impulse become conducting and remain so for the balance of one half-cycle of said source, means including a firing valve common to said pair of valves for transmitting said impulses thereto, transfer means operable as an incident to the operation of said firing valve for causing successive said impulses to be transmitted to said pair of valves in alternate relation, and blocking means operable as an incident to each operation of said firing valve for preventing reactuation of said firing valve until said blocking means is reset.

13. In a timing control system for controlling the connection between a work circuit and a source of alternating current, a pair of reversely connected valves disposed to be rendered conducting during respectively opposite half-cycles of said source, both of which are normally non-conducting but which upon the application of an igniting impulse become conducting and remain so for the balance of one half-cycle of said source, means including a firing valve common to said pair of valves for transmitting said impulses thereto, transfer means operable as an incident to the operation of said firing valve for causing successive said impulses to be transmitted to said pair of valves in alternate relation, timing means including phase shifting means for actuating said firing valve, and blocking means operably associated with said timing means for preventing more than a single actuation of said firing valve until said blocking means is reset.

14. In a timing control system for controlling the connection between a work circuit and a source of alternating current, switch means coupled between said source and said work circuit and disposed to control the flow of current therebetween, starting means operable upon each actuation to actuate said switch means to thereby cause a flow of current to said work circuit, control means successively operable at random relative to the polarity of said source for successively so actuating said starting means, additional means for causing each successive said flow of current to be initiated during a half-cycle of opposite polarity to that in which the preceding said flow of current was initiated, means for controlling the length of the period of said current flow and for preventing further such flow until reset, and means rendered effective as a consequence of the termination of such current flow for effecting said resetting.

15. In a timing control system for controlling the connection between a work circuit and a source of alternating current, switch means coupled between said source and said work circuit and disposed to control the flow of current therebetween, starting means operable upon each actuation to actuate said switch means to thereby cause a flow of current to said work circuit, control means successively operable at random relative to the polarity of said source for successively so actuating said starting means, additional means operable as a consequence of each operation of said control means for causing each successive said flow of current to be initiated during a half cycle of opposite polarity to that in which the preceding said flow of current was initiated, means for controlling the length of the period of said current flow and for preventing further such flow until reset, and means rendered effective as a consequence of the termination of such current flow for effecting said resetting.

16. In a timing control system for controlling the connection between a work circuit and a source of power, starting means which after being initially actuated from a normally ineffective condition remains effective until reset, means operably responsive to said actuation of said starting means for initiating a flow of current to said work circuit and for terminating said flow of current, and means rendered effective by said termination for effecting said resetting.

17. In a timing control system for controlling the connection between a work circuit and a source of power, starting means which after being initially actuated from a normally ineffective condition remains effective until reset, means operably responsive to said actuation of said starting means for initiating a flow of current to said work circuit and for terminating said flow of current, and means rendered effective by and as a consequence of said flow of current for effecting said resetting.

18. In a timing control system for controlling the connection between a work circuit and a source of power, starting means which after being initially actuated from a normally ineffective condition remains effective until reset, means operably responsive to said actuation of said starting means for initiating a flow of current to said work circuit, additional means for determining the length of the period during which said current flows and for preventing, until reset, a further flow of such current, and means rendered effective by and as a consequence of said flow of current for effecting said resetting of said starting means and said additional means.

19. In a timing control system for controlling the connection between a work circuit and a source of power, starting means which after being initially actuated from a normally ineffective condition remains effective until reset, means operably responsive to said actuation of said starting means for initiating a flow of current to said work circuit, additional means for determining the length of the period during which said current flows and for preventing, until reset, a further flow of such current, and means rendered effective by said termination for effecting said resetting of said starting means and said additional means.

CLETUS J. COLLOM.